United States Patent
Uchida

(10) Patent No.: US 11,537,795 B2
(45) Date of Patent: Dec. 27, 2022

(54) DOCUMENT PROCESSING DEVICE, DOCUMENT PROCESSING METHOD, AND DOCUMENT PROCESSING PROGRAM

(71) Applicant: HITACHI, LTD., Tokyo (JP)

(72) Inventor: Naokazu Uchida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 257 days.

(21) Appl. No.: 16/871,272

(22) Filed: May 11, 2020

(65) Prior Publication Data
US 2020/0372215 A1    Nov. 26, 2020

(30) Foreign Application Priority Data

May 23, 2019    (JP) .............................. JP2019-096575

(51) Int. Cl.
*G06F 40/268*    (2020.01)
*G06F 40/30*    (2020.01)
(Continued)

(52) U.S. Cl.
CPC .......... *G06F 40/268* (2020.01); *G06F 40/247* (2020.01); *G06F 40/253* (2020.01); *G06F 40/30* (2020.01)

(58) Field of Classification Search
None
See application file for complete search history.

(56) References Cited

U.S. PATENT DOCUMENTS

2014/0114649 A1\* 4/2014 Zuev ...................... G06F 16/93
  704/9
2018/0300312 A1\* 10/2018 Raiman .................. G06N 7/005
(Continued)

FOREIGN PATENT DOCUMENTS

JP    2013-143066 A    7/2013

OTHER PUBLICATIONS

Lee, Gary Geunbae, Jungyun Seo, Seungwoo Lee, Hanmin Jung, Bong-Hyun Cho, Changki Lee, Byung-Kwan Kwak et al. "SiteQ: Engineering High Performance QA System Using Lexico-Semantic Pattern Matching and Shallow NLP." In TREC. 2001. (Year: 2001).\*

(Continued)

*Primary Examiner* — Frank D Mills
(74) *Attorney, Agent, or Firm* — Volpe Koenig

(57) ABSTRACT

A document processing device includes: an input unit for receiving an input question sentence; a text analysis unit for performing a morphological analysis on a sentence received by the input unit; a hypothetical question storage unit for storing a hypothetical question sentence and an answer sentence in association with each other; a search unit for searching for the hypothetical question sentence similar to the input question sentence from the hypothetical question storage unit and obtaining an answer sentence; an output unit for outputting the answer sentence; and a normalization processing unit for performing a normalization on each word of the input question sentence and the hypothetical question sentence converted into word strings by the text analysis unit. The search unit is configured to perform a similarity determination on the input question sentence and the hypothetical question sentence whose words are normalized by the normalization processing unit.

13 Claims, 13 Drawing Sheets

(51) Int. Cl.
*G06F 40/253* (2020.01)
*G06F 40/247* (2020.01)

(56) References Cited

U.S. PATENT DOCUMENTS

2020/0311738 A1* 10/2020 Gupta .............. G06F 16/24578
2020/0327170 A1* 10/2020 Boxwell .......... G06F 16/90332
2021/0117458 A1* 4/2021 Higashinaka ....... G06F 16/3334

OTHER PUBLICATIONS

Juan, Zhong Min. "An effective similarity measurement for FAQ question answering system." In 2010 International Conference on Electrical and Control Engineering, pp. 4638-4641. IEEE, 2010. (Year: 2010).*

* cited by examiner

FIG. 4

| | PART OF SPEECH OF WORD OF INTEREST (401) | PART OF SPEECH OF TARGET WORD (402) | PRIMARY DETERMINATION (403) | SECONDARY DETERMINATION (404) |
|---|---|---|---|---|
| 405 | | | | |
| 406 | COMMON NOUN | COMMON NOUN | TARGET WORD IS SYNONYM OF WORD OF INTEREST | |
| 407 | COMMON NOUN | PROPER NOUN | TARGET WORD IS RELATED WORD OF WORD OF INTEREST | |
| 408 | COMMON NOUN | UNKNOWN WORD | TARGET WORD IS EXPRESSION VARIATION OR RELATED WORD OF WORD OF INTEREST | IF NOT IN RELATED WORD DB, TARGET WORD IS SYNONYM |
| 409 | PROPER NOUN | COMMON NOUN | TARGET WORD IS RELATED WORD OF WORD OF INTEREST | |
| | PROPER NOUN | PROPER NOUN | TARGET WORD IS RELATED WORD OF WORD OF INTEREST | |
| 410 | PROPER NOUN | UNKNOWN WORD | TARGET WORD IS EXPRESSION VARIATION OR RELATED WORD OF WORD OF INTEREST | IF NOT IN RELATED WORD DB, TARGET WORD IS SYNONYM |
| 411 | UNKNOWN WORD | COMMON NOUN | WORD OF INTEREST IS EXPRESSION VARIATION OR RELATED WORD OF TARGET WORD | IF NOT IN RELATED WORD DB, WORD OF INTEREST IS SYNONYM |
| 412 | UNKNOWN WORD | PROPER NOUN | WORD OF INTEREST IS EXPRESSION VARIATION OR RELATED WORD OF TARGET WORD | IF NOT IN RELATED WORD DB, WORD OF INTEREST IS SYNONYM |
| 413 | UNKNOWN WORD | UNKNOWN WORD | BOTH WORD OF INTEREST AND TARGET WORD ARE PROPER NOUNS OR EXPRESSION VARIATIONS, OR ONE IS PROPER NOUN AND THE OTHER IS EXPRESSION VARIATION | WHEN WORD OF INTEREST OR TARGET WORD EXISTS IN RELATED WORD DB, WORD NOT EXISTING IN RELATED WORD DB IS DETERMINED AS EXPRESSION VARIATION OF WORD EXISTING IN RELATED WORD DB |

FIG. 5

| | TARGET WORD (501) | | | NORMALIZATION EXPRESSION (502) | | |
|---|---|---|---|---|---|---|
| | EXPRESSION | PART OF SPEECH | READING | EXPRESSION | PART OF SPEECH | READING |
| 503 | Computer | COMMON NOUN | COMPUTER | COMPUTER | COMMON NOUN | COMPUTER |
| 504 | ELEVATOR | UNKNOWN WORD | ELEVATOR | ELEVATOR | COMMON NOUN | ELEVATOR |
| 505 | REPLY | COMMON NOUN | REPLY | ANSWER | COMMON NOUN | ANSWER |
| 506 | FAILURE | COMMON NOUN | FAILURE | FAULT | COMMON NOUN | FAULT |

FIG. 6

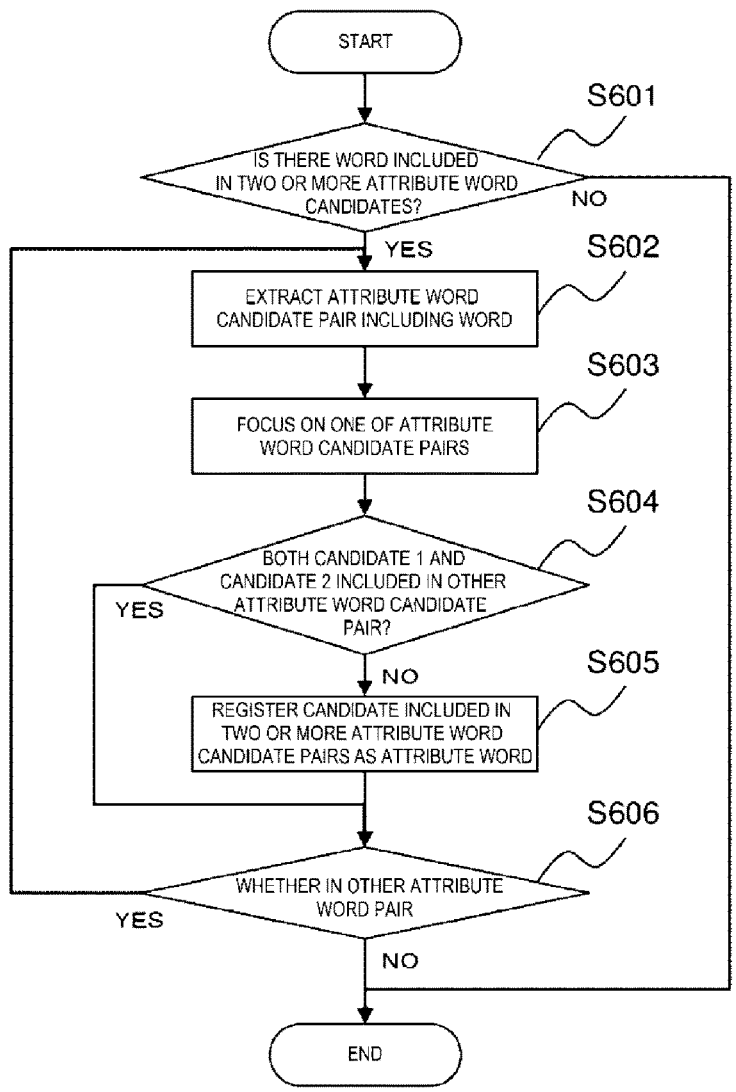

FIG. 7

| | ATTRIBUTE WORD CANDIDATE 1 (701) | | | ATTRIBUTE WORD CANDIDATE 2 (702) | | |
|---|---|---|---|---|---|---|
| 703 | EXPRESSION | PART OF SPEECH | READING | EXPRESSION | PART OF SPEECH | READING |
| 704 | COMPANY A | PROPER NOUN | COMPANY A | A01 | UNKNOWN WORD | A01 |
| 705 | COMPANY A | PROPER NOUN | COMPANY A | A02 | UNKNOWN WORD | A02 |
| 706 | OFF | COMMON NOUN | OFF | ON | COMMON NOUN | ON |
| 707 | LAN | COMMON NOUN | LAN | PORT | COMMON NOUN | PORT |
| 708 | USB | COMMON NOUN | USB | PORT | COMMON NOUN | PORT |
| 709 | LAN | COMMON NOUN | LAN | CABLE | COMMON NOUN | CABLE |

FIG. 8

| TARGET WORD | | | ATTRIBUTE WORD | | | |
|---|---|---|---|---|---|---|
| EXPRESSION | PART OF SPEECH | READING | EXPRESSION | PART OF SPEECH | READING | INSERTION POSITION |
| A01 | UNKNOWN WORD | A01 | COMPANY A | PROPER NOUN | COMPANY A | BEFORE |
| A02 | UNKNOWN WORD | A02 | COMPANY A | PROPER NOUN | COMPANY A | BEFORE |

DOCUMENT PROCESSING DEVICE, DOCUMENT PROCESSING METHOD, AND DOCUMENT PROCESSING PROGRAM

BACKGROUND OF THE INVENTION

1. Field of the Invention

The present invention relates to a document processing device, a document processing method, and a document processing program, and particularly to an interactive document search device, an interactive document search method, and an interactive document search program for obtaining an answer sentence to a question sentence.

2. Description of the Related Art

An interactive search device is a device that receives a question related to a specific field in a natural sentence and returns an answer based on the natural sentence by a system, and is also called a question-answer system. As a device of this type, for example, Patent Literature 1 (JP-A-2013-143066) discloses a technique in which numerous comment sentences related to keywords extracted from question sentences are classified into potential topic groups, answer sentence candidates are selected by associating answer sentences similar to a sentence group included in the topic group, and a representative keyword, which is a difference between the selected answer sentence candidates, is clearly indicated and selected by a user.

According to the technique described in Patent Literature 1, the answer sentence to the question sentence is obtained, and in particular, when a plurality of answer sentence candidates exist for the question sentence of the user, an answer sentence reflecting an intention of the user is clearly indicated (narrowed down).

However, when an omission or an expression variation of a word exists in the question sentence or the answer sentence, the keyword may not be smoothly matched, and an appropriate answer sentence may not be searched. As described in Patent Literature 1, when a document sufficiently checked, such as a publicly available FAQ or business manual, is taken as a target, such a problem is unlikely to occur. However, documents such as in-office inquiry records are not proofread, and may include many omissions and expression variations. Particularly in technical fields where there are many technical terms, omitted expressions of technical terms and proper nouns are frequently used, and there is a tendency that the way of expression differs depending on creators. When a question search mechanism is to be constructed by using such a document resource, there is a risk that the search is omitted or an incorrect search result is answered due to small differences in words included in a sentence.

SUMMARY OF THE INVENTION

Therefore, an object of the invention is to obtain an appropriate answer sentence even for a document including missing words and expression variations.

According to a preferred embodiment, a document processing device according to the invention includes: an input unit configured to receive an input question sentence; a text analysis unit configured to perform a morphological analysis on a sentence received by the input unit; a hypothetical question storage unit configured to store a hypothetical question sentence and an answer sentence in association with each other; a search unit configured to search for the hypothetical question sentence similar to the input question sentence from the hypothetical question storage unit and obtain an answer sentence corresponding to the hypothetical question sentence; an output unit configured to output the answer sentence obtained by the search unit; and a normalization processing unit configured to perform a normalization on each word of the input question sentence and the hypothetical question sentence converted into word strings by the text analysis unit, in which the search unit is configured to perform a similarity determination on the input question sentence and the hypothetical question sentence whose words are normalized by the normalization processing unit.

The invention also relates to a document processing method and a document processing program.

According to the invention, it is possible to obtain an appropriate answer sentence even for a document including missing words and expression variations.

BRIEF DESCRIPTION OF THE DRAWINGS

FIG. 4 is a diagram showing a part of speech correspondence table in the normalization DB registration processing according to the embodiment.

FIG. 5 is a diagram showing a synonym table according to the embodiment.

FIG. 6 is a diagram showing a flowchart of an attribute word registration processing according to the embodiment.

FIG. 7 is a diagram showing an attribute word candidate table according to the embodiment.

FIG. 8 is a diagram showing an attribute word table according to the embodiment.

DESCRIPTION OF THE PREFERRED EMBODIMENTS

Figure 1:
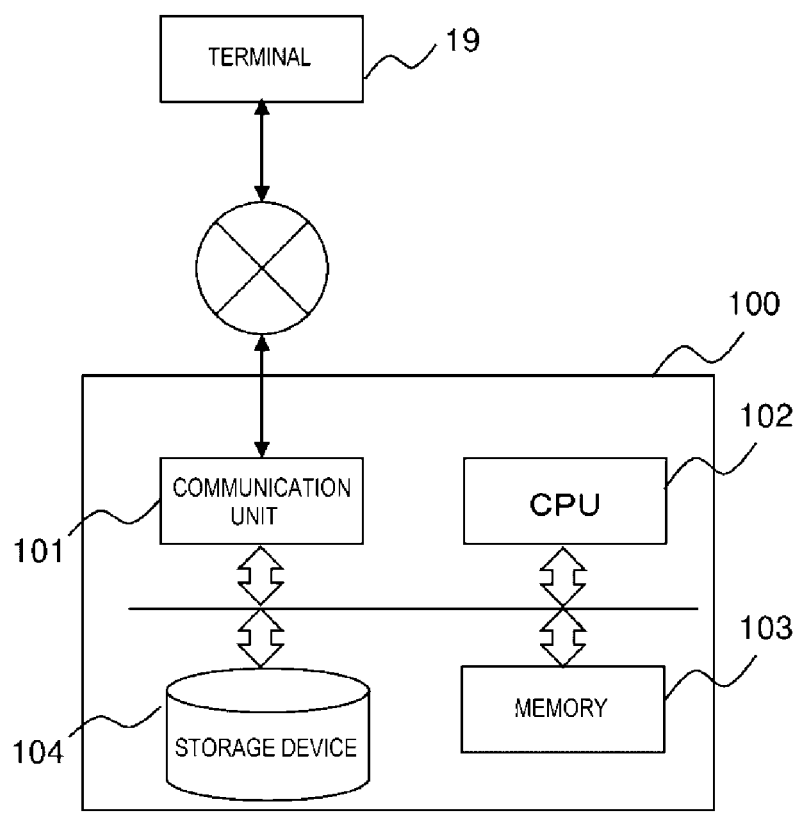
FIG. 1 is a diagram showing an example of an interactive search system according to an embodiment.

An example of an interactive search device will be described as a preferred embodiment of a document processing device. That is, the interactive search device for estimating a word that may be omitted as a synonym based on a document group of a search target, unifying the synonym and expression variation in both an input question sentence input by a user and a hypothetical question sentence of the search target, and performing a search after performing a normalization processing for complementing an omitted word will be described.

When any of word A and word B in the document are used in the same context, it is considered that the word A and the word B are used in the document with relatively similar meanings. Whether two sentences are in the same context depends on words configuring the sentences and dependency relationships thereof, but the sentences in the same context are often configured with the same word, so that a determination that whether the two sentences are in the same context can be made to some extent only by the matching number of words. Therefore, if words appearing around the word A and the word B match to some extent, the word A and the word B are used in the same context, that is, the word A and the word B can be considered to be words having similar meanings.

A word embedding vector is a technique for numeralizating a similarity of meanings between words under such an assumption. The word embedding vector is a method of converting words into real number vectors of about 200 dimensions based on a statistic of a plurality of words that appear before and after each of all words in a learning corpus, and can measure the similarity of the meanings between the words by a cosine similarity between vectors. By generating the word embedding vector based on a target document group and extracting a word whose cosine similarity is equal to or larger than a certain value for any word, a word used in a meaning similar to the word can be extracted.

However, the cosine similarity between the words depends on the matching number of words that appear before and after the both words, so that, in addition to synonyms, words that frequently co-occur with the word in the dependency relationship are also extracted. Therefore, a morpheme N-gram (word N-gram) of the target document group is generated, and whether the words extracted based on the cosine similarity of the word embedding vector are included in the same N-gram entry is determined so as to determine whether there is a close co-occurrence relationship in the words, and to distinguish the words from synonyms.

Here, the words having the co-occurrence relationship means that a meaning of a phrase configured with the words may not be changed even if one of the words is omitted. Therefore, a list of such words is created and used for complementing words in a sentence during a search.

Words with a high cosine similarity but not having a co-occurrence relationship are synonym candidates. Such words include synonyms and expression variations whose meanings do not change even when replaced, and also include related words that are similar but cannot be replaced, such as place names. Therefore, the synonyms and related words are determined based on part of speech information described later, and the synonyms and expression variations are extracted. Based on the above, unification of the synonyms and expression variations in the sentences is performed at the time of search.

First Embodiment

Hereinafter, a preferred embodiment will be described with reference to the drawings.

In the first embodiment, an example of an interactive search device for normalizing synonyms and expression variations into a unique expression for an input question sentence input by a user and a hypothetical question sentence as a search target, and performing a search after complementing an omitted word is described.

FIG. 1 shows an interactive search system.

The interactive search system includes an interactive search device 100 and a terminal 19. The terminal 19 is an information processing device, such as a personal computer (PC), a smartphone, and a tablet, which is operated by the user and can be connected to a network. The terminal 19 is connected to the interactive search device 100 via the network, transmits a text of a question sentence to the interactive search device 100, and receives a response from the interactive search device 100. Although one terminal 19 is shown in FIG. 1, a plurality of terminals 19 may be connected to the interactive search device 100.

The interactive search device 100 as a document processing device is a computer that performs a search processing while communicating with the terminal 19 via a communication unit 101, and includes a CPU (processing unit) 102 that performs a program and implements required functions, and a memory 103 and a storage device 104 for storing data.

Figure 2:
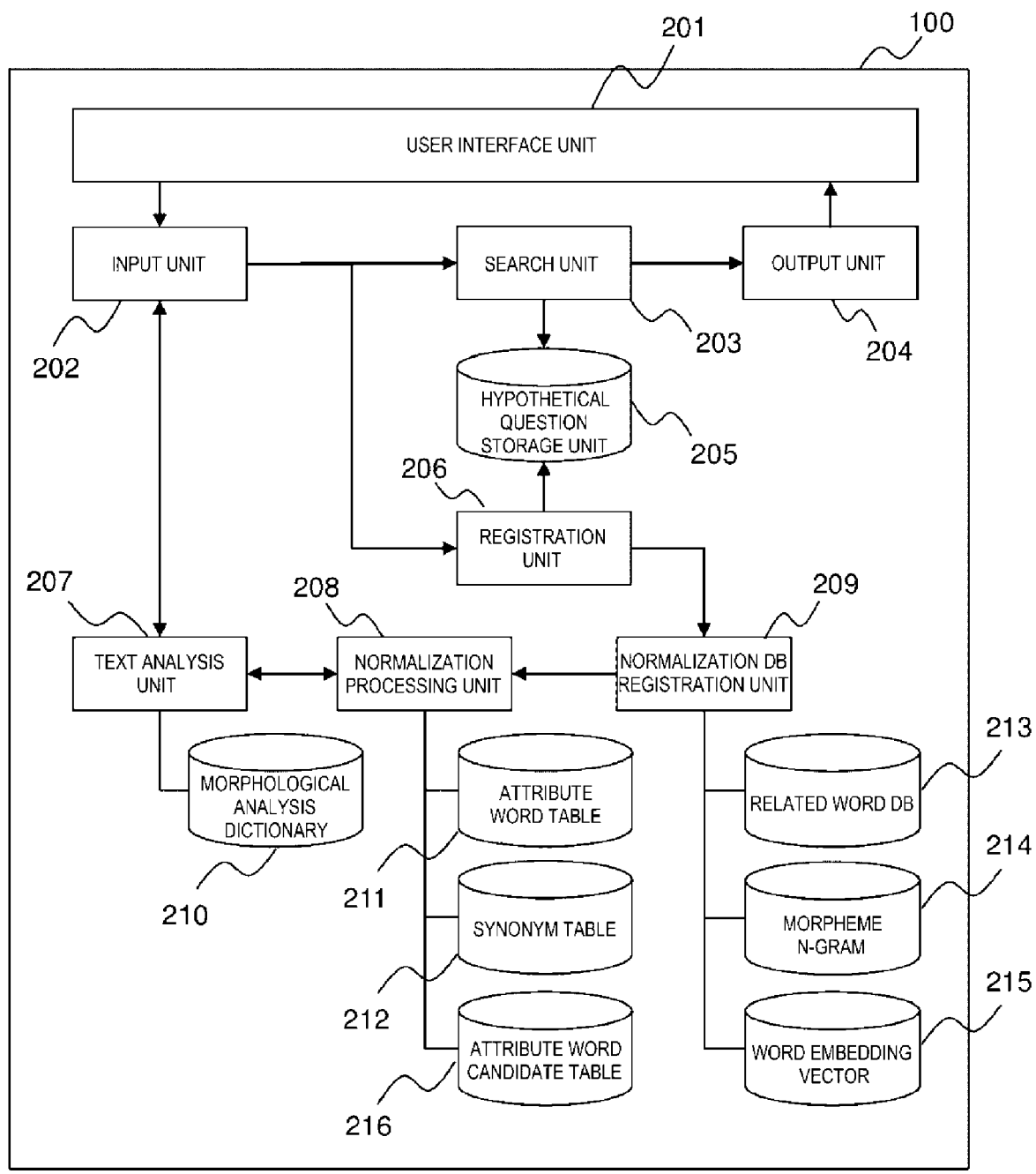
FIG. 2 is a diagram showing a configuration example of the interactive search device according to the embodiment.

FIG. 2 shows a functional configuration of the interactive search device 100.

The interactive search device 100 includes an input unit 202, a search unit 203, an output unit 204, an hypothetical question storage unit 205, a registration unit 206, a text analysis unit 207, a normalization processing unit 208, a normalization DB registration unit 209, a morphological analysis dictionary 210, an attribute word table 211, a synonym table 212, an attribute word candidate table 216, a related word DB 213, a morpheme N-gram 214, and a word embedding vector 215. These main components are implemented by the CPU 102 performing an interactive search program. Further, the above tables and DBs (databases) are formed in the memory 103 or the storage device 104. Hereinafter, each unit will be described in detail.

A user interface unit 201 is a module that provides a user interface of the interactive search device, and has functions implemented by a Web server, a Web application server, or the like. The user interface unit 201 generates the user interface of the interactive search device to be displayed on a browser of the terminal 19, receives a text input from the terminal 19, outputs the text to the input unit 202, receives an answer sentence from the output unit 204, and outputs the answer sentence to the terminal 19.

A dedicated application may be used in the terminal 19, and the user interface unit 201 may be configured to exchange the text with the application.

The input unit 202 is a module that transfers text data received from the user interface unit 201 to each module of the interactive search device, and all processing, registration, and search of the text data are performed via the input unit 202.

The search unit 203 is a module that searches the hypothetical question storage unit 205 for a question sentence (hereinafter, referred to as an input question sentence) received from the terminal 19 via the user interface unit 201 and outputs an answer sentence obtained from a result of the search to the output unit 204. The search unit 203 calculates a similarity by comparing the input question sentence with a hypothetical question registered in the hypothetical question storage unit 205. As a result, an answer sentence associated with a hypothetical question sentence having a highest similarity is output to the output unit 204. At this time, when the similarity is lower than a predetermined threshold, no answer sentence is output, and a notification that the corresponding hypothetical question sentence is not found (that is, there is no target) is output to the output unit 204. The search processing only needs to be able to compare texts and numeralizates the similarity, and can be implemented using a known full-text search technique or the like.

The output unit 204 is a module that outputs the answer sentence transferred from the search unit 203 to the user interface unit 201. When the search by the search unit 203 indicates that no result matching the question sentence is obtained, an answer sentence indicating that the question cannot be answered is generated and output.

The hypothetical question storage unit 205 is a module that stores a hypothetical question sentence and an answer sentence thereof. One answer sentence is associated with the hypothetical question sentence. More specifically, a morphologically analyzed hypothetical question sentence and an answer sentence as a text are registered. In the search processing, it is assumed that no search is performed for the answer sentence, so that the answer sentence is stored as the text. A plurality of hypothetical question sentences may be associated with one answer sentence. When a question sentence having a plurality of phrases is explicitly created during creation of a hypothetical question, the plurality of hypothetical question sentences are associated with one answer sentence.

The registration unit 206 is a module that registers a hypothetical question and an answer thereof in the hypothetical question storage unit 205. Hypothetical question data is received from the input unit 202. The registration unit 206 can register the hypothetical question data one by one or collectively. During registration, registration is performed on data received from the input unit 202 after checking data deficiencies such as duplicate registration. A case where an already registered hypothetical question and an answer are included in the input hypothetical question data, or a hypothetical question sentence to which no answer sentence is associated is excluded. Further, the registration unit 206 also outputs the received data to the normalization DB registration unit 209 for use in a normalization processing performed by the normalization processing unit 208.

The text analysis unit 207 performs a morphological analysis on the text received from the input unit 202, further normalizes a morphological analysis result by the normalization processing unit 208, and outputs the normalized morphological analysis result to the input unit 202. The text analysis unit 207 performs the processing of unifying alphanumeric symbols and katakana to full-width characters, and for kanji, converting allographs such as old words into common kanji, and performs a possible normalization in a character unit as the processing before the morphological analysis.

In the morphological analysis, the text is divided into word strings using the morphological analysis dictionary 210, and read and part of speech information is added. The morphological analysis dictionary 210 is a database having read and part of speech information for each word, occurrence costs of words learned from a large text corpus, and connection costs between the words. A morphological analysis processing of the text analysis unit 207 divides the text into word strings by dividing the text at appropriate positions in Japanese based on information in the morphological analysis dictionary 210.

The text analysis unit 207 performs a processing such that, even for words that are not registered in the morphological analysis dictionary 210, a series of katakana including long notes and a series of alphanumeric characters including hyphens are divided as one word. The words divided in such a way are tagged with unknown words, so as to be distinguished from general words analyzed by the dictionary. With this processing, technical terms in katakana expressions that are not in the dictionary, proper nouns such as product names, and products and model types written in alphanumeric strings are also divided into one word.

The normalization processing unit 208 is a module that normalizes synonyms and expression variations and complements omitted words for received word strings. In the normalization of the synonyms and expression variations, when there is the corresponding word after referring to the synonym table 212, the synonym and expression variation is replaced with a word registered in the synonym table 212. In complementing the omitted words, when there is the corresponding word after referring to the attribute word table 211, a word registered in the attribute word table 211 is inserted. Details of the normalization processing performed by the normalization processing unit 208 will be described later.

In the attribute word table 211, a word that has a co-occurrence relationship with a certain word and that may be omitted is registered. For example, when there is a product "A01" made by "Company A" and it is obvious that "A01" is made by "Company A", "Company A" may be omitted and only "A01" is written. In the attribute word table 211, a pair of "Company A" and "A01" in such a case are registered. Since "Company A" represents an attribute of "A01", in the present embodiment, "Company A" is called an attribute word for "A01". The attribute word table 211 is created by the normalization DB registration unit 209. FIG. 8 shows an example of the attribute word table. The attribute word candidate table 216 is a table generated in the process of creating the attribute word table 211 by the normalization DB registration unit 206. FIG. 7 shows an example of the attribute word candidate table.

In the synonym table 212, a synonym that can be replaced and has the same meaning as a certain word is registered. The expression variation is, for example, "コンピュータ", "Computer", or the like for "コン ピューター". The synonym table 212 is created by the normalization DB registration unit 209. FIG. 5 shows an example of the synonym table.

The related word DB 213 includes words included in a document registered in the hypothetical question storage unit 205, such as technical specifications and product manuals in the same field as the document registered in the hypothetical question storage unit 205, and stores a morphological analysis result of a document that has been proofread and has no expression variation. The related word DB 213 is used in a normalization DB registration processing performed by the normalization DB registration unit 209 to determine whether an unknown word in the question sentence is an expression variation. When there is a list of words that can include the document to be registered in the hypothetical question storage unit 205, the list may be registered.

The morpheme N-gram 214 is a morpheme N-gram created based on the morphological analysis results of all hypothetical question sentences and answer sentences thereof which are registered in the hypothetical question storage unit 205. The morpheme N-gram 214 is created in the normalization DB registration processing performed by the normalization DB registration unit 209, and in the same processing, is used for a processing of extracting a word whose appearance frequency is equal to or larger than a predetermined number in the learning corpus and a processing of examining whether two words have a co-occurrence relationship. The present embodiment is described using 3 grams obtained for an appearance probability of up to three connected words, but when the number of hypothetical question sentences and answer sentences used as the learning corpus is sufficiently large, 4 grams or more may be used. If N is large, a word pair having a co-occurrence relationship at more distant positions can also be confirmed.

The word embedding vector 215 is a word embedding vector created based on the morphological analysis results of all the hypothetical question sentences and the answer sentences thereof which are registered in the hypothetical question storage unit 205. The word embedding vector 215 is created in the normalization DB registration processing performed by the normalization DB registration unit 209, and is used in a processing of extracting synonyms and attribute words.

The normalization DB registration unit 209 is a module that performs the normalization DB registration processing of creating the attribute word table 211 and the synonym table 212 by using the hypothetical question sentences and the answer sentences transferred from the registration unit 206. In the creation of the attribute word table 211 and the synonym table 212, the word embedding vector 215, the morpheme N-gram 214, and the related word DB 213 are used. The word embedding vector 215 and the morpheme N-gram 214 are generated based on the morphological analysis result of the hypothetical question and the answer thereof which are registered in the hypothetical question storage unit 205 by the registration unit 206.

[Normalization DB Registration Processing]

Figure 3:
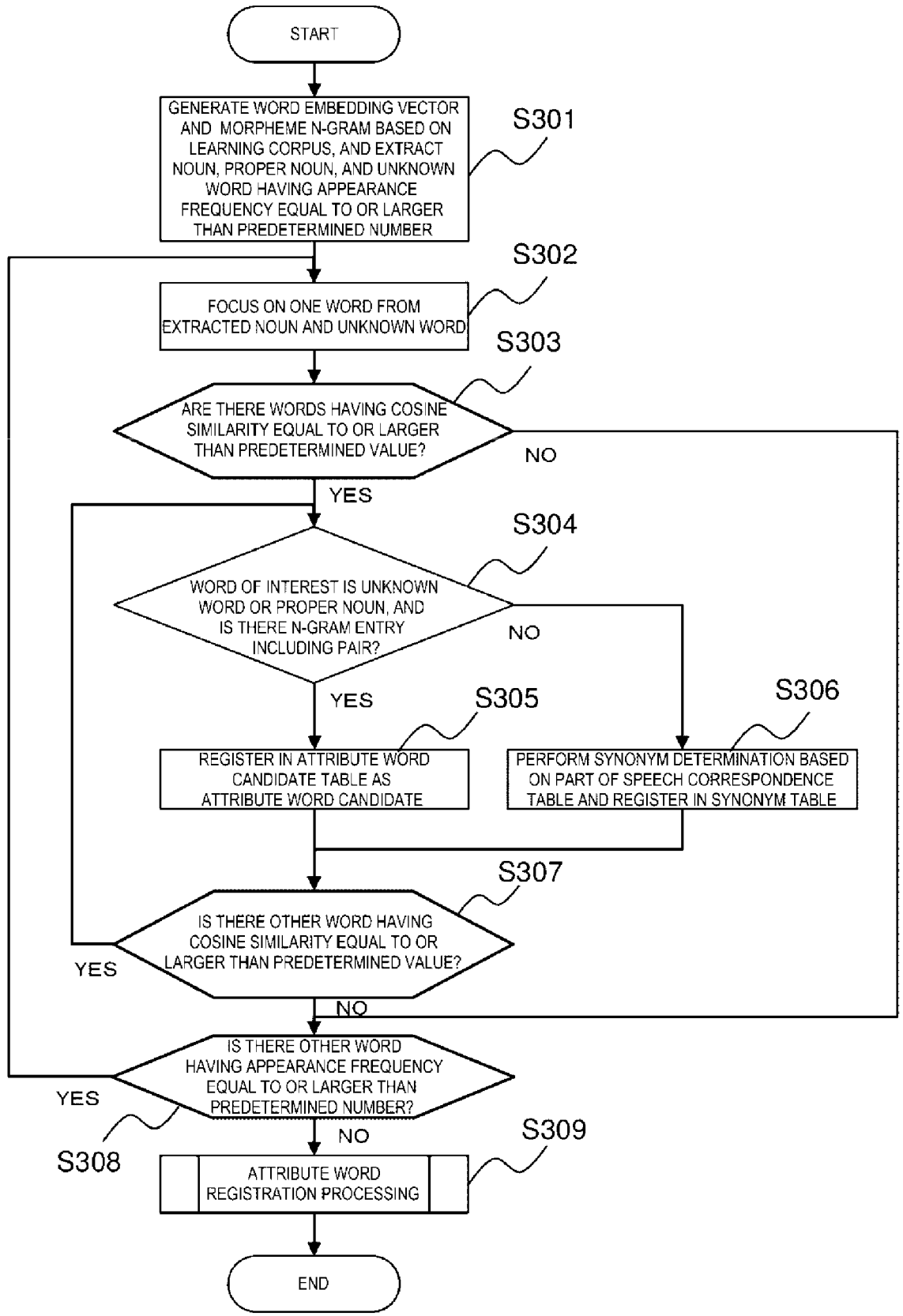
FIG. 3 is a diagram showing a flowchart of a normalization DB registration processing according to the embodiment.

FIG. 3 shows a flow of the normalization DB registration processing. In the normalization DB registration processing, for nouns and unknown words having appearance frequency equal to or larger than the predetermined number in the learning corpus (learning text), synonyms and attribute words of the words are estimated, and registered in the attribute word table 211 and the synonym word table 212, respectively. The normalization DB registration processing is performed via the registration unit 206 when the user collectively registers a hypothetical question collection. When a text of the hypothetical question collection after the morphological analysis processing is received from the registration unit 206, the normalization DB registration unit 209 generates the word embedding vector 215 based on the text. The word embedding vector in the hypothetical question storage unit 205 is a technique of vectorizing words based on relative meanings of words in the learning corpus, such as word2vec. In the word embedding vector, a similarity of meanings between words is represented by a cosine similarity between vectors. The normalization DB registration unit 209 also generates a morpheme N-gram in addition to the word embedding vector.

After generating the word embedding vector and the morpheme N-gram based on the learning corpus, the normalization DB registration unit 209 extracts words whose appearance frequency is equal to or higher than the predetermined number and whose part of speech is common nouns, proper nouns, and unknown words by referring to 1 gram of the morpheme N-gram (S301). One of the extracted words is focused on (S302), a word (hereinafter, referred to as a target word) having a cosine similarity equal to or larger than a predetermined value with respect to a word (hereinafter, referred to as a word of interest) is extracted from the word embedding vector (S303). The target word is a word calculated to have a meaning relatively similar to the word of interest in the learning corpus used for generating the word embedding vector.

A similarity of meanings between words is calculated by words appearing in contexts before and after the word in the learning corpus, and words having a high cosine similarity are words used in the same context. Therefore, the target word may be a synonym that can be replaced and has exactly the same meaning as the word of interest, or may be a related word that is of the same kind but cannot be replaced, such as a place name. In addition, words having a co-occurrence relationship in the same phrase are also included. The meaning is understood even when one of the words having a co-occurrence relationship in the same phrase is omitted, and in the subsequent processing, these words are classified to extract synonyms and attribute words.

When there are target words having a cosine similarity equal to or larger than the predetermined value (S303: YES), the normalization DB registration unit 209 focuses on one of the target words, and searches for an entry including the word of interest and the target word by referring to entries having 2 grams and 3 grams of N-gram. When there is an entry including two words (S304: YES), the two words can be determined as words having a co-occurrence relationship. However, at this stage, it cannot be determined which one of the two words is an attribute word.

In an example of "A01 (of a product of) Company A", when "A01" is a proper noun of the product of "Company A", "Company A" is an attribute word of "A01", and it is considered that the meaning is understood even when "Company A" is omitted. However, it is considered that an example in which "A01" is not the proper noun of the product of "Company A" but "A01 (of a product of) Company B". In this case, "Company A" is a word that cannot be omitted. Therefore, in order to estimate an attribute word that can be omitted, it is necessary to examine word relationships of the entire learning corpus. Therefore, at this time, the word is registered in the attribute word candidate table 216 as an attribute word candidate (S305).

At this time, the target word and the word of interest are registered in forms of attribute word candidate 1 and attribute word candidate 2 in a word order in the N-gram entry. For example, when a word of the target word and a word of the word of interest appear in the N-gram entry in the word order, the target word is registered as the attribute word candidate 1 and the word of interest is registered as the attribute word candidate 2. FIG. 7 shows examples of the attribute word candidate. For example, when the word of interest is "A01", the target word is "Company A", and "A01 of Company A" exists as a 3-gram entry, "Company A" is registered as the attribute word candidate 1 and "A01" is registered as the attribute word candidate 2 (704).

When there is no entry including the word of interest and the target word in the N-gram (S304: NO), it is determined that the target word is a synonym and expression variation, or a related word of the word of interest. Next, the normalization DB registration unit 209 determines whether the target word is the synonym and expression variation or the related word. In order to determine the synonym and expression variation and the related word, a primary determination is performed based on a combination of part of speeches of the word of interest and the target word, and a secondary determination using the related word DB 213 is further performed based on the combination of the part of speeches. The determination reference is shown in FIG. 4. The normalization DB registration unit 209 performs registration in the synonym table according to a part of speech correspondence table (synonym determination reference) shown in FIG. 4 (S306).

When both the word of interest and the target word are common nouns (405), the normalization DB registration unit 209 determines that the target word is a synonym of the word of interest and registers the target word in the synonym table 212 as the synonym of the word of interest. When the word of interest is a common noun and the target word is a proper noun (406), it is considered that the target word has a meaning narrower than that of the word of interest and cannot be replaced with each other, so that the normalization DB registration unit 209 determines that the target word is a related word, and does not register the target word in the synonym table 212. When the target word is a common noun and the word of interest is an unknown word (407), there is a possibility that the target word is an expression variation of the word of interest or is a proper noun of the same kind as the word of interest. Whether the target word is an expression variation or a proper noun of the word of interest is determined by referring to the related word DB 213 and checking whether there is the target word.

It is assumed that the documents stored in the related word DB 213 sufficiently include technical terms of business handled by the interactive search device, and do not have expression variations because the documents have been proofread. Therefore, when the target word exists in the related word DB 213, it can be determined that the target word is not an expression variation but a proper noun used in the relevant field. In this case, since a condition is the same as a case where the word of interest is a common noun and the target word is a proper noun, the normalization DB registration unit 209 determines that the target word is a related word. On the other hand, when the target word does not exist in the related word DB 213, the target word can be regarded as an expression variation of the word of interest. Therefore, the normalization DB registration unit 209 determines that the target word is a synonym of the word of interest.

When the word of interest is a proper noun and the target word is a common noun (408), since the target word is a general noun of the same kind as the word of interest, the normalization DB registration unit 209 determines that the target word is a related word of the word of interest, and does not register the target word in the synonym table 212. When both the word of interest and the target word are proper nouns (409), since the word of interest and the target word are the same kinds of words, the normalization DB registration unit 209 again determines that the target word is a related word of the word of interest, and does not register the target word in the synonym table 212. When the word of interest is a proper noun and the target word is an unknown word (410), the target word is considered to be an expression variation of the word of interest or a related word of the same kind as the word of interest. Therefore, in order to determine either the expression variation or the related word, the related word DB 213 is referred to. When the target word exists in the related word DB, the target word is determined as a related word. When the target word does not exist in the related word DB, the target word is determined as an expression variation (synonym) of the word of interest and is registered in the synonym table 212.

When the word of interest is an unknown word and the target word is a common noun (411), or when the word of interest is an unknown word and the target word is a proper noun (412), the word of interest is determined as an expression variation or a related word of the target word, and the normalization DB registration unit 209 refers to the related word DB 213 to determine either the expression variation or the related word. As a result of the reference, when the word of interest exists in the related word DB, the normalization DB registration unit 209 determines that the word of interest is a related word of the target word, and does not register the word of interest in the synonym table 212. When the word of interest does not exist in the related word DB, the normalization DB registration unit 209 determines that the word of interest is an expression variation (synonym) of the target word, and registers the word of interest in the synonym table 212.

When both the word of interest and the target word are unknown words (413), a pattern in which both the word of interest and the target word are proper nouns, or both are expression variations, or one is a proper noun and the other is an expression variation is considered. Therefore, the normalization DB registration unit 209 searches for both the word of interest and the target word by referring to the related word DB 213, and checks whether the two words exist in the related word DB. When both the word of interest and the target word exist in the related word DB, since the word of interest and the target word are related to each other, the word of interest and the target word are not registered in the synonym table 212.

When neither the word of interest nor the target word exists in the related word DB, since both the word of interest and the target word are considered to be expression variations of other words, the word of interest and the target word are not registered in the synonym table. When either the word of interest or the target word exists in the related word DB, a word not existing in the related word DB is determined as an expression variation of a word existing in the related word DB, and is registered in the synonym table 212.

The above processing is performed for all the target words of the word of interest (S307: YES). When the check is completed for all the target words of the word of interest (S307: NO), the word of interest is changed and the same processing is repeated (S308: YES), and for nouns, proper nouns, and unknown words whose appearance frequency is equal to or larger than the predetermined value, synonyms and attribute word candidates of these words are extracted.

FIG. 5 shows an example of the synonym table. A rule is to replace a target word (501) with a normalization expression (502). 503 denotes an example of an expression variation of a common noun. 504 denotes an example of an expression variation of an unknown word. 505 is an example of a synonym.

Next, an attribute word is determined from the attribute word candidates extracted in S305, and registered in the attribute word table (S309). FIG. 6 shows a flow of an attribute word registration processing, and FIG. 7 shows an example of the attribute word candidates. The normalization DB registration unit 209 examines whether there is a word included in two or more attribute word candidate pairs by referring to the attribute word table 211. In the example of FIG. 7, "Company A" is included in 704 and 705, "LAN" is included in 707 and 708, and "port" is included in 707 and 708.

When there is no word included in two or more attribute word candidate pairs (S601: NO), the processing is completed without registering the attribute word. This is because it cannot be determined which one is the attribute word by only one attribute word candidate pair. When there is a word included in two or more attribute word candidate pairs (S601: YES), the normalization DB registration unit 209 extracts the attribute word candidate pairs including the word (S602). In FIG. 7, pairs other than an "OFF" and "ON" pair 706 are extracted.

Next, focusing on one of the extracted attribute word candidate pairs (S603), it is examined whether both the attribute word candidate 1 and the attribute word candidate 2 are included in two or more attribute word candidate pairs. In the case of 704, "Company A" is included in 704 and 705, but only 704 includes "A01". Therefore, it is not included in the above condition (S604: NO). When the condition is satisfied, the normalization DB registration unit 209 registers the attribute word candidate pair in the attribute word table (S605). At this time, the word included in two or more attribute word candidate pairs is set as the attribute word. In the case of 704, "Company A" is the attribute word.

On the other hand, when the words of the attribute word candidate 1 and the attribute word candidate 2 are both included in other attribute word candidate pairs (S604: YES), the words are not registered as attribute words. In FIGS. 7, 707, 708, and 709 correspond to the above case. In 707, "LAN" of the attribute word candidate 1 is included in 707 and 709, and "port" of the attribute word candidate 2 is also included in 707 and 708. "port" is a common attribute of "LAN" and "USB", but "LAN" is a common attribute of "port" and "cable".

When there is an attribute relationship between each other, since complement of an attribute word is likely to have a different meaning, registration as an attribute word is not performed. In this way, all attribute word candidate pairs are examined for selecting attribute words. FIG. 8 shows an attribute word table finally registered in the attribute word table for the example of the attribute word candidates shown in FIG. 7. The attribute word table includes a target word 801 and an attribute word 802. In the normalization processing performed by the normalization processing unit 208, a processing of inserting an attribute word when the target word is included is performed.

An insertion position 803 of the attribute word table 211 indicates whether the insertion position for complementing the attribute word is before or after the target word. The insertion position 803 is determined depending on whether the target word 801 is the attribute word candidate 1 or the attribute word candidate 2 in the attribute word candidate table shown in FIG. 7. The example of "A01" and "Company A" shows that "A01" is the attribute word candidate 2 and "Company A" is the attribute word candidate 1 in the attribute word candidate table, and "Company A" appears before "A01" in the learning corpus. According to this information, the insertion position 803 is "before".

[Normalization Processing]

The text analysis unit 207 performs the normalization processing of the word string of the morphological analysis result on the input question sentence and the hypothetical question sentence via the normalization processing unit 208. The normalization processing unit 208 performs the normalization processing including a processing of normalizing the synonym and expression variation into a unique expression using the attribute word table 211 and the synonym table 212 which are created by the normalization DB registration unit 209, and a processing of inserting the omitted word into the word string using the attribute word table 211.

Figure 9:
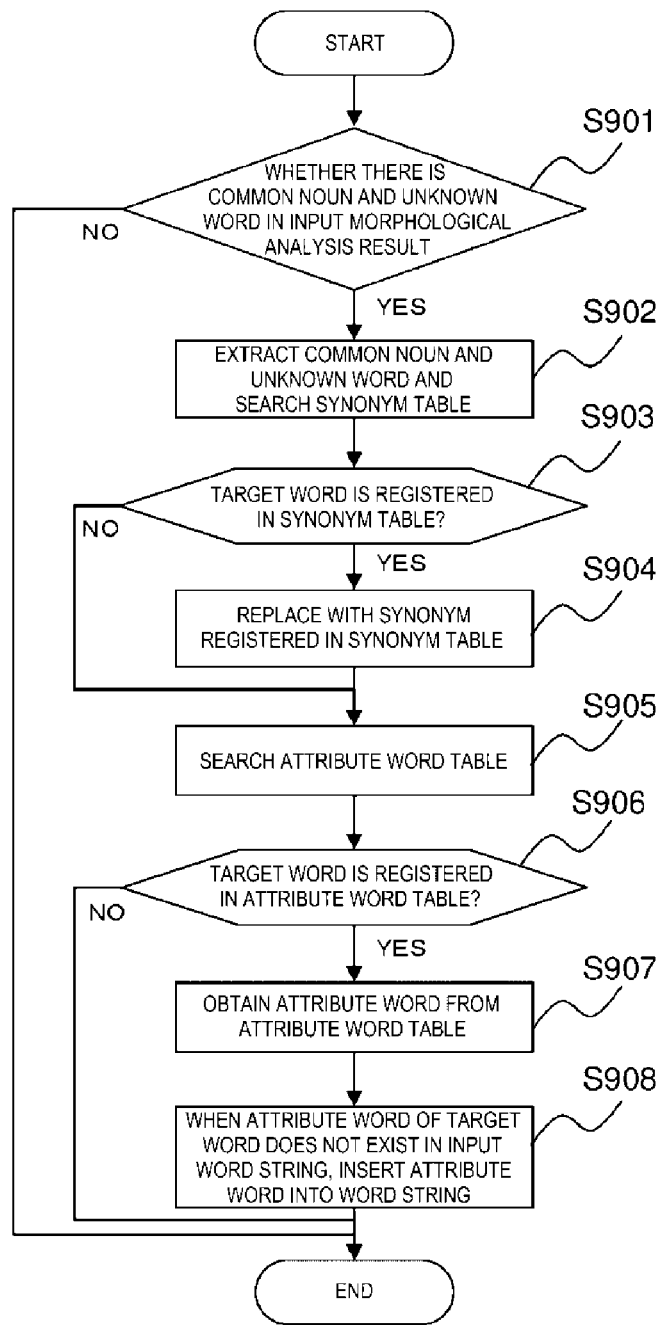
FIG. 9 is a diagram showing a flowchart of a normalization processing according to the embodiment (first embodiment).

Targets to be normalized by the normalization processing are common nouns and unknown words. Referring to FIG. 9, the normalization processing unit 208 determines whether the word string of the morphological analysis result received from the text analysis unit 207 includes a common noun and an unknown word based on the part of speech information (S901). When the result of the determination is that neither a common noun nor an unknown word is included (S901: NO), the processing is completed because there is no word to be normalized. On the other hand, when one or more common nouns or unknown words are included (S901: YES), the common nouns and the unknown words are extracted, and it is searched whether the extracted words are in the target words of the synonym table 212 by referring to the synonym table 212 (S902). As a result of the search, when a target word is registered in the synonym table 212 (S903: YES), a normalized word paired with the target word is obtained in the synonym table 212, and the target word is replaced with the normalized word. This operation is performed for all the extracted words (S904). On the other hand, when a target word is not registered in the synonym table (S903: NO), no processing is performed.

Next, referring to the attribute word table 211, the omitted word is complemented. That is, the normalization processing unit 208 searches for the common nouns and the unknown words extracted in S902 by referring to the attribute word table 211 (S905). As a result of the search, when there is a target word matching in the attribute word table 211 (S906), the attribute word of the target word is obtained from the attribute word table 211 (S907). Then, it is examined whether the obtained attribute word exists in the input word string. Then, when the attribute word does not exist in the input word string, the obtained attribute word is inserted into the word string (S908).

[Hypothetical Question Registration Processing]

Figure 10:
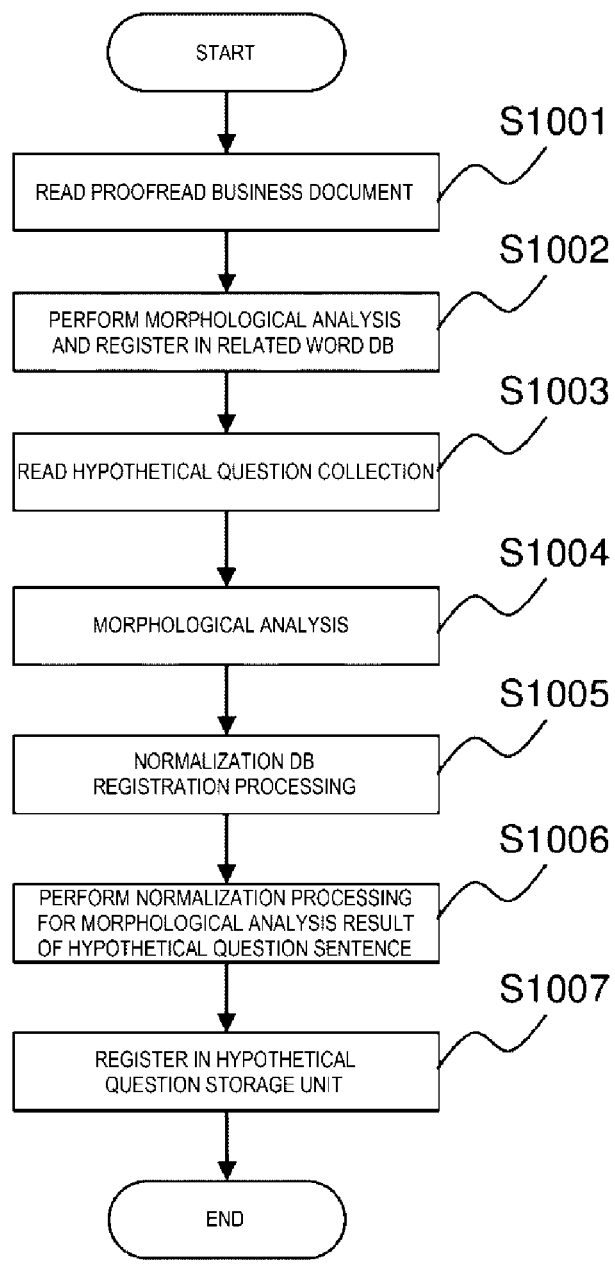
FIG. 10 is a diagram showing a flowchart of a hypothetical question registration processing according to the embodiment.

FIG. 10 shows a flowchart of a processing for registering a hypothetical question. In registration of the hypothetical question, the related word DB 213 is registered in advance. That is, the input unit 202 reads an input proofread business document and outputs the input proofread business document to the text analysis unit 207 (S1001). Then, the word string of the morphological analysis result is received from the text analysis unit 207. At this time, the normalization processing of the normalization processing unit 208 is not performed. The word string of the morphological analysis result is input to the normalization DB registration unit 209 via the registration unit 206, and the normalization DB registration unit 209 registers the word string in the related word DB 213 (S1002).

Next, the input unit 202 reads a text (hypothetical question collection) of hypothetical question sentences and answer sentences thereof (S1003), and outputs the text to the text analysis unit 207. The text analysis unit 207 performs a morphological analysis on all the input hypothetical question sentences and answer sentences, and outputs the word string of the morphological analysis result to the input unit 202 (S1004). At this time, the normalization processing of the normalization processing unit 208 is also not performed. For the hypothetical question sentences only, since the normalization processing is performed after the normalization DB registration processing, the morphological analysis result of the hypothetical question sentences is temporarily stored.

The input unit 202 outputs the word string of the morphological analysis result to the normalization DB registration unit 209 via the registration unit 206 (S1004). The normalization DB registration unit 209 performs the normalization DB registration processing using the morphological analysis result of the hypothetical question sentences and the answer sentences as a learning corpus, and registers the attribute word table and the synonym table via the normalization processing unit 208 (S1005). Next, the text analysis unit 207 outputs the morphological analysis result of the hypothetical question sentences stored in S1004 to the normalization processing unit 208, and the normalization processing unit 208 performs the normalization processing on the attribute word table and the synonym table created in S1005 for the input morphological analysis result of the hypothetical question sentences and outputs the morphological analysis result to the text analysis unit 207 (S1006). The text analysis unit 207 outputs the input normalization-processed morphological analysis result to the input unit 202.

The input unit 202 outputs, to the registration unit 206, the hypothetical question sentences after the morphological analysis and the normalization, the hypothetical question sentences only after the morphological analysis, and the answer sentences as the text, which are received from the text analysis unit 207. The registration unit 206 registers, in the hypothetical question storage unit 205, the morphological analysis result of the hypothetical question sentences (both with and without normalization) and the text of the answer sentences associated therewith (S1007). When an error exists in the attribute word table 211 and the synonym table 212, the hypothetical question sentence without normalization is used to cause the user to correct the table, and to perform the normalization processing again based on the table.

Figure 12:
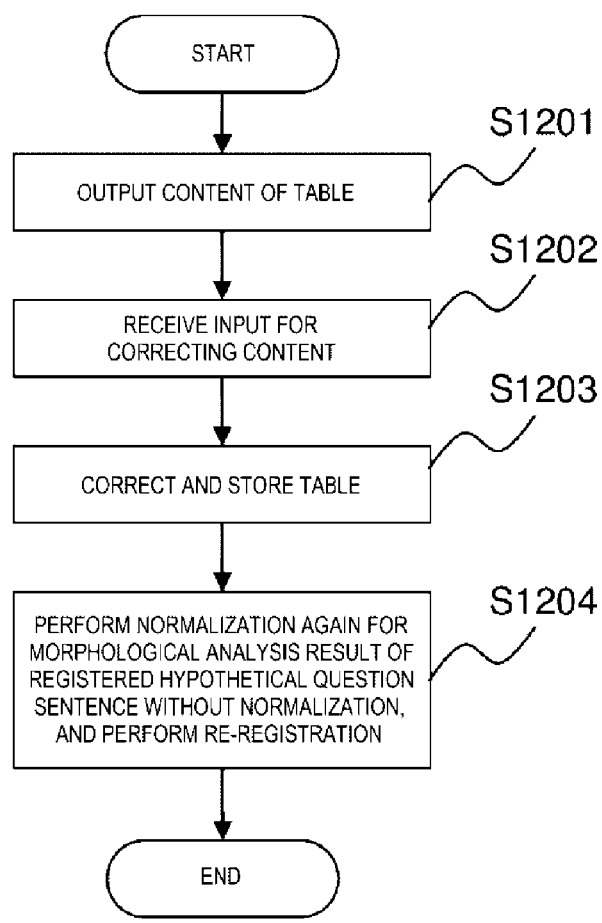
FIG. 12 is a diagram showing a flowchart of an attribute word table and synonym table editing processing according to the embodiment.

FIG. 12 shows a flowchart of an attribute word table and synonym table editing processing. The attribute word table and synonym table editing processing is performed when a table editing button is pressed on an operation screen described later. When the table editing button is pressed, the registration unit 206 reads the attribute word table 211 and the synonym table 212 via the normalization DB registration unit 209 and the normalization processing unit 208, and outputs the content to the output unit 204 (S1201).

Next, the input unit 202 receives an input for correcting contents of the tables (S1202), and corrects and stores the tables (S1203). The input of correction receives a change of a word to be replaced or complemented, and a deletion or addition of a row of the tables.

After the correction, the normalization processing unit 208 performs, using the corrected tables, the normalization processing again for the morphological analysis result of the hypothetical question sentences without normalization in the hypothetical question storage unit 205, and the registration unit 206 overwrites and registers a normalization result in the hypothetical question storage unit 205 (S1204).

[Search Processing]

Figure 11:
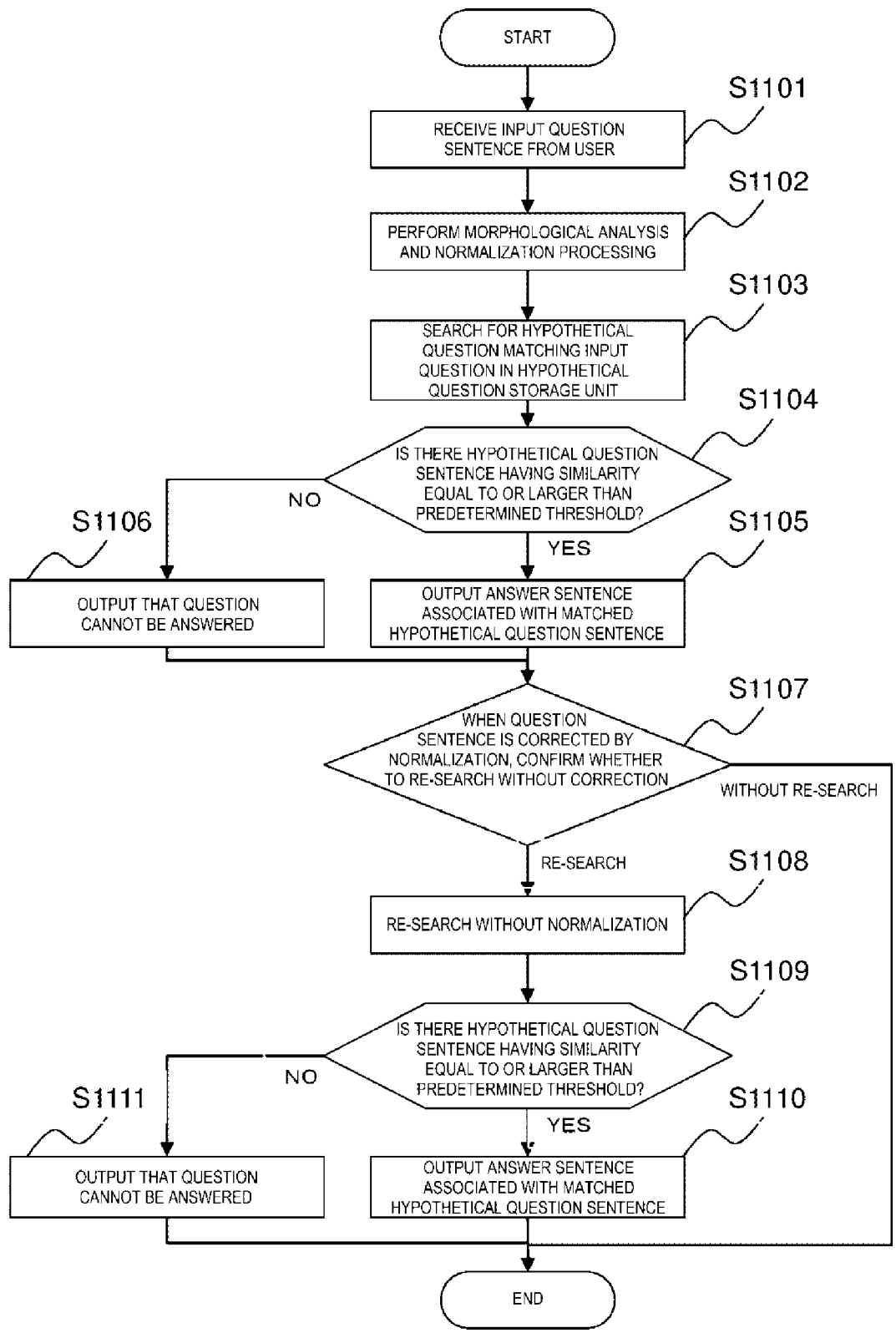
FIG. 11 is a diagram showing a flowchart of a search processing according to the embodiment.

FIG. 11 shows a flowchart of the search processing. The search processing includes an operation of performing a search for an input question sentence received from the terminal 19 by the user and outputting an answer sentence.

First, the input unit 202 receives the question sentence (input question sentence) received from the terminal 19 (S1101), and transfers the received input question sentence to the text analysis unit 207. Next, the text analysis unit 207 performs a morphological analysis on a text of the input question sentence, and transfers the morphological analysis result to the normalization processing unit 208. The normalization processing unit 208 performs the normalization processing, and returns the result to the input unit 202 via the text analysis unit 207 (S1102).

The input unit 202 outputs the word string of the morphological analysis result to the search unit 203. The search unit 203 searches for a hypothetical question sentence similar to the input question sentence by referring to the hypothetical question storage unit 205. As a result of the search, when a hypothetical question sentence having a similarity equal to or larger than the predetermined threshold is found (S1104: YES), the search unit 203 outputs a text of an answer sentence associated with the matched hypothetical question sentence to the output unit 204 (S1105). The output unit 204 outputs the answer sentence to the user interface unit 201.

On the other hand, when a hypothetical question sentence having a similarity equal to or larger than the predetermined threshold is not found (S1104: NO), the search unit 203 outputs a notification that there is no target (the question cannot be answered) to the output unit 204. The output unit 204 outputs a sentence indicating that the question cannot be answered to the user interface unit 201 (S1106).

In the normalization processing of S1102, when a word is complemented by the attribute word table or a word is replaced by the synonym table, the terminal 19 is inquired via the user interface unit 201 that whether to re-search without normalization (S1107). When a re-search is specified by the terminal 19 (S1107: "re-search"), the re-search is performed using an input sentence without normalization as a search query (S1108). The processing related to the search (S1109 to S1111) is the same as S1104 to S1106.

Figure 14:
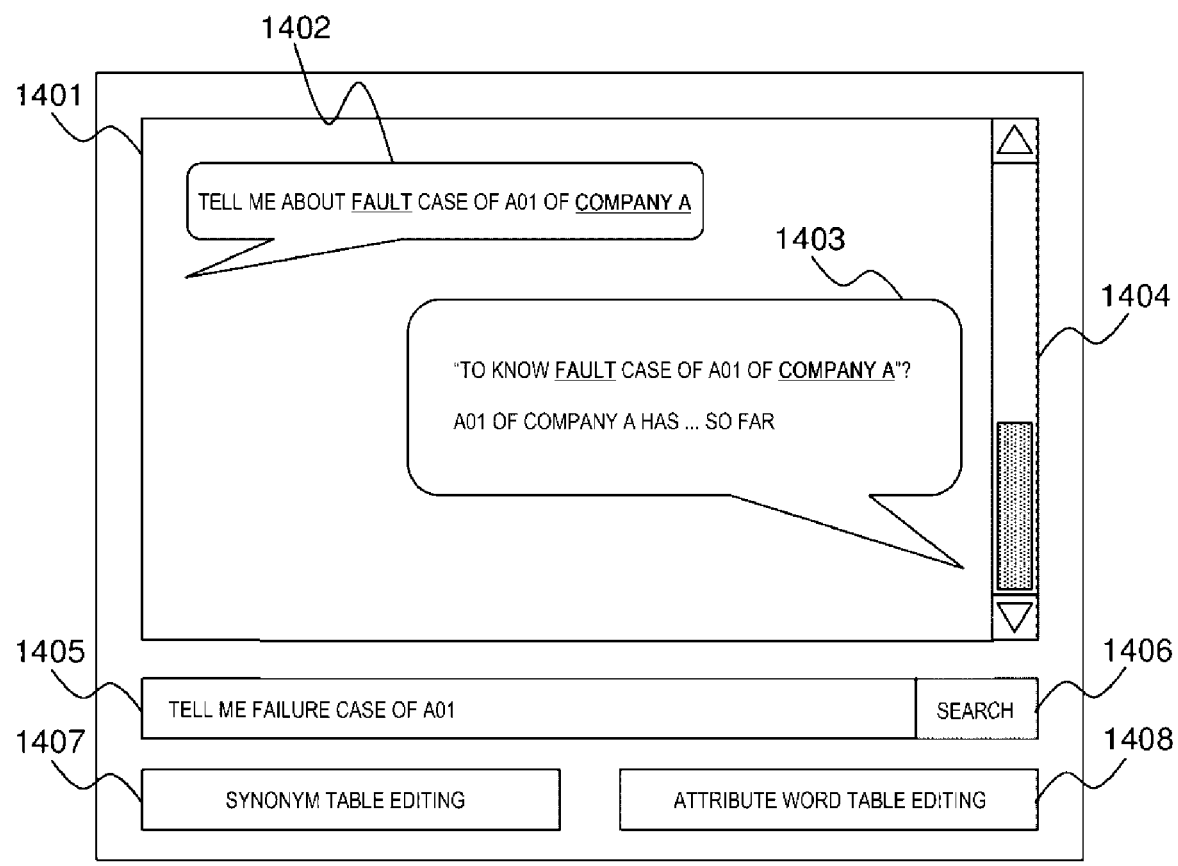
FIG. 14 is a diagram showing an example of a display screen of a terminal according to the embodiment.

FIG. 14 shows an example of a display screen displayed on the terminal 19.

The display screen of the terminal 19 includes a search field 1401, an input field 1405 for the user to input a question sentence, a search button 1406, a synonym table editing button 1407, and an attribute word table editing button 1408. The search field 1401 includes a display of a normalization result 1402 of a question sentence input to the input field 1405 and a display of an answer sentence 1403 obtained as a result of a search. The displays 1402 and 1403 of the search field 1401 are displayed when the search button 1406 is pressed for the question sentence of the input field 1405. 1404 denotes a scroll bar for displaying dialog histories (search histories).

As the normalization result 1402, the normalization result of the question sentence input in the input field 1405 is displayed, but in the example shown in FIG. 14, "Company A" is complemented, and "failure" is replaced with "fault". A reconstructed text is displayed by connecting expressions of morphemes without displaying the morphological analysis result directly. "Company A" is inserted before "A01" according to the information of the insertion position 803 in the attribute word table 211 (see FIG. 8). As shown in the display 1402, a portion corrected by the normalization processing is highlighted in bold, underline, change in font and color, or the like, so that it is easy for the user to understand. As shown in the display 1403, a correction of the hypothetical question sentence is also highlighted. By displaying in this way, even if a search is performed with an erroneous complement or replacement, the error can be noticed by the user.

The synonym table editing button 1407 and the attribute word table editing button 1408 are buttons for the user to edit the tables. When the buttons are pressed, the attribute word table and synonym table editing processing described in FIG. 12 is performed.

Figure 15:
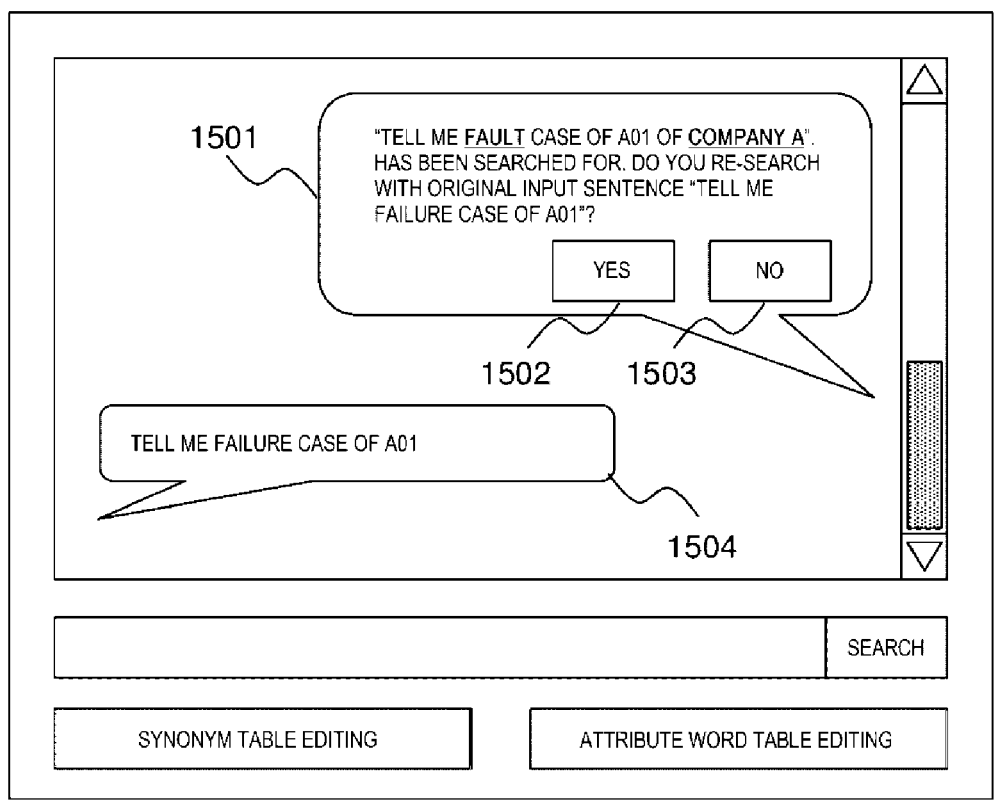
FIG. 15 is a diagram showing an example of a display screen of the terminal according to the embodiment.

Similarly, FIG. 15 is an example of a display screen in a processing operation after S1107 of the search processing shown in FIG. 11. 1501 denotes a message for confirming that the search has been performed after normalization and whether to search using the original input sentence. When the user selects "Yes" 1502, the search unit 206 performs a re-search without normalization (S1108).

As described above, according to the first embodiment, for an input question sentence by a user operation from the terminal 19 and a hypothetical question sentence to be searched, synonyms and expression variations are normalized to a unique expression, and the search is performed after complementing the omitted word, so that an answer sentence can be obtained by searching for a more appropriate hypothetical question sentence.

Second Embodiment

In the first embodiment, the omitted word is complemented, but in the second embodiment, an example in which a search is performed after deleting a word that can be omitted is shown. In a case of complementing the word in the first embodiment, when an incorrect word is registered in the normalization DB registration processing, an unnecessary word may be inserted. In contrast, in the second embodiment, such a situation can be prevented without inserting a word.

Figure 13:
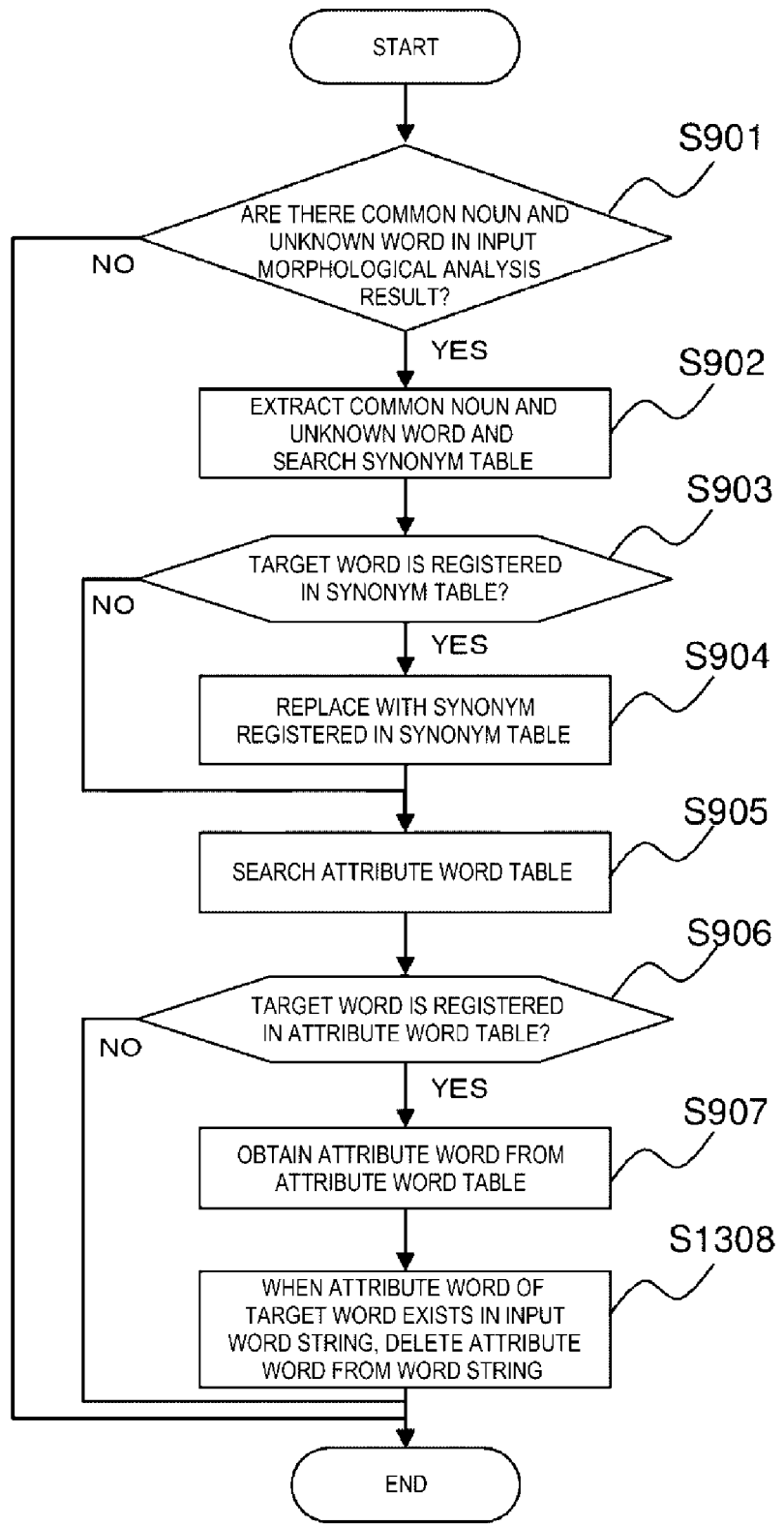
FIG. 13 is a diagram showing a flowchart of a normalization processing according to a second embodiment.

FIG. 13 shows a flowchart of a normalization processing according to the second embodiment. The processing from S901 to S907 is the same as the normalization processing (S901 to S907) described with reference to FIG. 9 of the first embodiment, and a description thereof is omitted. In S1308, it is examined whether the attribute word obtained in S907 exists in the input word string. Then, when the attribute word exists in the input word string, the attribute word is deleted.

As described above, according to the second embodiment, for an input question sentence received from a user and a hypothetical question sentence to be searched, synonyms and expression variations are normalized to a unique expression, and the search is performed after deleting the word that can be omitted, so that an answer sentence can be obtained by searching for a more appropriate hypothetical question sentence.

While the preferred embodiments have been described above, the invention is not limited to the embodiments described above, and includes various modifications. For example, the embodiments described above have been described in detail for easy understanding of the invention, and are not necessarily limited to those including all the configurations described above. Further, a part of the configuration of one embodiment can be replaced with the configuration of another embodiment, and the configuration of another embodiment can be added to the configuration of one embodiment. Further, another configuration may be added to a part of the configuration of each embodiment, and the part of the configuration may be deleted or replaced with another configuration. Further, each of the configurations, the functions, the processing units, the processing steps, or the like described above may be partially or entirely implemented with hardware such as by designing an integrated circuit.

What is claimed is:

1. A document processing device comprising:
a memory; and
a computer coupled to the memory and configured to:
receive an input question sentence;
perform a morphological analysis on a sentence received by the input unit;
store a hypothetical question sentence and an answer sentence in association with each other;
search for the hypothetical question sentence similar to the input question and obtain an answer sentence corresponding to the hypothetical question sentence;
a display configured to output the answer sentence; and
perform a normalization on each word of the input question sentence and the hypothetical question sentence converted into word strings,
perform a similarity determination on the input question sentence and the hypothetical question sentence whose words are normalized; and
wherein the computer if further configured to, for any first word, when there is a second word or a third word whose co-occurrence probability with the first word in a word string having a predetermined number of words is equal to or larger than a predetermined value in a search target document group, deletes the first word from a sentence including the first word and the second word having the number of words between the first word and the second word equal to or less than a predetermined number, or a sentence including the first word and the third word having the number of words between the first word and the third word equal to or less than a predetermined number.

2. The document processing device according to claim 1, wherein the computer is further configured to, for any first word and second word, when the number of words matching with each other appearing around the first word and the second word in a target document group is equal to or larger than a predetermined value, and when the second word is not included in related word information covering words of the target document group, replace the first word with the second word for a sentence including the first word.

3. The document processing device according to claim 1, wherein the computer is further configured to, for any first word, when there is a second word or a third word whose co-occurrence probability with the first word in a word string having a predetermined number of words is equal to or larger than a predetermined value in a search target document group, inserts the first word into a word string including the second word or the third word.

4. The document processing device according to claim 1, wherein the computer is further configured to:
generate synonyms and attribute words of words including nouns and unknown words whose appearance frequency is equal to or larger than a predetermined number in a learning corpus;
and wherein the device further comprises an attribute word table configured to register the attribute words generated by the computer; and
a synonym table configured to register the synonyms generated by the computer.

5. The document processing device according to claim 4, wherein the computer is further configured to search the synonym table for words including common nouns and unknown words included in the input question sentence, and as a result of the search, when a target word is registered in the synonym table, obtain a normalized word paired with the target word, and replace the target word with the normalized word.

6. The document processing device according to claim 4, wherein the computer is further configured to search the attribute word table for words including common nouns and unknown words included in the input question sentence, when there is a target word matching the words, obtain an attribute word corresponding to the target word, and when there is no attribute word in an input word string, insert the obtained attribute word into the word string.

7. The document processing device according to claim 5, wherein the computer is configured to perform a similarity determination on the input question sentence in which the words included in the input question sentence are replaced with the normalized words by the normalization processing unit and the hypothetical question sentence, or perform a similarity determination on the input question sentence in which the attribute word is inserted into the word string and the hypothetical question sentence.

8. The document processing device according to claim 5, wherein after generating a word embedding vector and a morpheme N-gram based on the learning corpus, the computer extracts a word whose appearance frequency is equal to or larger than the predetermined number and whose part of speech is common nouns, proper nouns, and unknown words by referring to 1 gram of the morpheme N-gram, and when a word having a cosine similarity equal to or larger than a predetermined value with respect to the word, makes the word a target word and when there is no word of interest corresponding to the target word in the N-gram, determines the target word as a synonym, expression variation or a related word of the word of interest.

9. A document processing method for performing a document processing using a computer, the document processing method comprising:
    an input step of receiving an input question sentence;
    a text analysis step of performing a morphological analysis on a sentence received by the input step;
    a search step of searching for, from the hypothetical question storage unit configured to store a hypothetical question sentence and an answer sentence in association with each other, the hypothetical question sentence similar to the input question sentence, and obtaining an answer sentence corresponding to the hypothetical question sentence;
    an output step of outputting the answer sentence obtained by the search step; and
    a normalization processing step of performing a normalization on each word of the input question sentence and the hypothetical question sentence converted into word strings by the text analysis step,
    wherein in the search step, a similarity determination is performed on the input question sentence and the hypothetical question sentence whose words are normalized by the normalization processing step; and
    wherein, for any first word, when there is a second word or a third word whose co-occurrence probability with the first word in a word string having a predetermined number of words is equal to or larger than a predetermined value in a search target document group, the first word is deleted from a sentence including the first word and the second word having the number of words between the first word and the second word equal to or less than a predetermined number, or a sentence including the first word and the third word having the number of words between the first word and the third word equal to or less than a predetermined number.

10. The document processing method according to claim 9, further comprising:
    a normalization DB registration step of generating synonyms of words including nouns and unknown words whose appearance frequency is equal to or larger than a predetermined number in a learning corpus; and
    a step of registering the synonyms generated by the normalization DB registration step in a synonym table,
    wherein in the normalization processing step, the synonym table is searched for words including common nouns and unknown words included in the input question sentence received by the input step, and as a result of the search, when a target word is registered in the synonym table, a normalized word paired with the target word is obtained, and the target word is replaced with the normalized word.

11. The document processing method according to claim 9, further comprising:
    a normalization DB registration step of generating attribute words of words including nouns and unknown words whose appearance frequency is equal to or larger than a predetermined number in a learning corpus; and
    a step of registering the attribute words generated by the normalization DB registration step in an attribute word table,
    wherein in the normalization processing step, the attribute word table is searched for words including common nouns and unknown words included in the input question sentence received by the input step, when there is a target word matching the words, an attribute word corresponding to the target word is obtained, and when there is no attribute word in an input word string, the obtained attribute word is inserted into the word string.

12. The document processing method according to claim 9, further comprising:
    displaying a screen including an input field of the input question sentence, a search button, a normalization result of the input question sentence input to the input field, and the answer sentence obtained as a result of the search on a terminal connected to the computer via a network.

13. The document processing method according to claim 10, further comprising:
    displaying a screen for inquiring whether to re-search without normalization on a terminal connected to the computer via a network when a word is replaced using the synonym table or a word is complemented using an attribute word table.

* * * * *